(12) United States Patent
Yamamoto et al.

(10) Patent No.: US 9,050,931 B2
(45) Date of Patent: Jun. 9, 2015

(54) VEHICLE PERIPHERY MONITORING SYSTEM (75) Inventors: Kinji Yamamoto, Anjo (JP); Kazuya Watanabe, Anjo (JP)

(73) Assignee: AISIN SEIKI KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/131,475

(22) PCT Filed: Jul. 12, 2012

(86) PCT No.: PCT/JP2012/067837
§ 371 (c)(1),
(2), (4) Date: Jan. 8, 2014

(87) PCT Pub. No.: WO2013/015130
PCT Pub. Date: Jan. 31, 2013

(65) Prior Publication Data
US 2014/0152827 A1 Jun. 5, 2014

(30) Foreign Application Priority Data
Jul. 26, 2011 (JP) ................................. 2011-163482

(51) Int. Cl.
*B60R 1/00* (2006.01)
*G06K 9/00* (2006.01)
*G06T 3/40* (2006.01)

(52) U.S. Cl.
CPC .............. *B60R 1/00* (2013.01); *G06K 9/00791* (2013.01); *B60R 2300/607* (2013.01); *G06T 3/4038* (2013.01)

(58) Field of Classification Search
CPC ....................... G06K 9/00791; B60R 2300/607
USPC .......................................................... 348/148
See application file for complete search history.

(56) References Cited

U.S. PATENT DOCUMENTS 7,728,879 B2 * 6/2010 Ishii ........................... 348/222.1
2003/0085999 A1 5/2003 Okamoto et al.
(Continued)

FOREIGN PATENT DOCUMENTS

CN 1412047 A 4/2003
CN 1953553 A 4/2007
(Continued)

OTHER PUBLICATIONS

Okamoto et al., "Monitoring System", Jan. 23, 2002, JP 2002-019556, [0013] and fig. 7.*
(Continued)

*Primary Examiner* — Christopher S Kelley
*Assistant Examiner* — Matthew Kwan
(74) *Attorney, Agent, or Firm* — Sughrue Mion, PLLC (57) ABSTRACT Provided is a vehicle periphery monitoring system that facilitates a driver's understanding about a photographing direction of an object which appears in an overlapping area of a bird's-eye view image generated from multiple photographed images. A displaying bird's-eye view image is generated by combining bird's-eye view image segments generated from the multiple photographed images photographed in a partially overlapping manner with superimposing mutually overlapped areas thereof. In displaying the displaying bird's-eye view image, a boundary-added bird's-eye view image formed by adding a boundary indicator to the overlapping area of the bird's-eye view image is displayed on a display unit; then, a merged superimposed image is displayed. The merged superimposed image is obtained by merging the overlapped areas of the bird's-eye view image according to a preset merger relationship.

13 Claims, 7 Drawing Sheets merged bird's-eye view image

(56) References Cited

U.S. PATENT DOCUMENTS

| | | |
|---|---|---|
| 2007/0085901 A1 | 4/2007 | Yang et al. |
| 2009/0097708 A1* | 4/2009 | Mizuta .................. 382/103 |
| 2009/0128630 A1 | 5/2009 | Kanaoka et al. |
| 2010/0092042 A1 | 4/2010 | Asari |
| 2010/0194596 A1* | 8/2010 | Wang et al. ............ 340/936 |
| 2010/0220190 A1 | 9/2010 | Hiroshi |
| 2011/0156887 A1 | 6/2011 | Shen et al. |

FOREIGN PATENT DOCUMENTS

| | | |
|---|---|---|
| EP | 2 174 834 A2 | 4/2010 |
| JP | 2002-19556 A | 1/2002 |
| JP | 2003-169323 A | 6/2003 |
| JP | 2007-27948 A | 2/2007 |
| JP | 2007-104373 A | 4/2007 |
| JP | 2013-26801 A | 2/2013 |

OTHER PUBLICATIONS

International Preliminary Report on Patentability for PCT/JP2012/067837 dated Jan. 28, 2014.

International Search Report of PCT/JP2012/067837, dated Oct. 2, 2012.

"A Manual of an Around View Monitor", Nissan Motor Co., Ltd., pp. 266-276.

Extended European Search Report, dated Oct. 10, 2014, issued in counterpart European Patent Application No. 12817899.3.

Chinese Office Action, dated Dec. 1, 2014, cited in corresponding Chinese Patent Application No. 201280037054.4.

* cited by examiner

Fig.7
merged bird's-eye view image

Fig.8
merged bird's-eye view image

Fig.9
merged bird's-eye view image

VEHICLE PERIPHERY MONITORING SYSTEM

CROSS REFERENCE TO RELATED APPLICATIONS

This application is a National Stage of International Application No. PCT/JP2012/067837 filed Jul. 12, 2012, claiming priority based on Japanese Patent Application No. 2011-163482, filed Jul. 26, 2011, the contents of all of which are incorporated herein by reference in their entirety.

TECHNICAL FIELD

The present invention relates to a vehicle periphery monitoring system wherein bird's-eye view image segments are generated from photographed images capturing the view of vehicle periphery in a partially overlapping manner and a displaying bird's-eye view image generated by combining these bird's-eye view image segments in a partially overlapping manner with superimposing mutually overlapped areas thereof is displayed in a displaying section.

BACKGROUND ART

With the conventional vehicle periphery monitoring system that generates a bird's-eye view image, generally an image photographed by an in-vehicle camera is projected onto a projection plane parallel with the road surface. Namely, with a projective transformation with positioning a virtual viewpoint perpendicularly upward, a bird'-eye view image from the immediately upward is generated. By causing this bird'-eye view image to be displayed on a monitor, a driver can effectively monitor a road surface condition in the vehicle periphery, in particular, an obstacle present on the road surface. However, as this in-vehicle camera employs a wide angle lens, in the bird'-eye view image obtained through the projective transformation, there occurs a greater distortion in the image in an area far from the camera than an area near the camera, which distortion makes it difficult for the driver to grasp the direction of the obstacle.

For instance, a three-dimensional object (a human, a car, an on-road 3D object such as a road cone for construction work, etc.) placed on the road surface and extending upward will appear in a distorted shape elongated in the photographing direction of each camera. In particular, in synthesis of bird's-eye view image segments generated from respective photographed images, if this synthesis is effected only by simple merger (blending) of mutually overlapped areas thereof, this will generate two images of the 3D object with elongations in the respective photographing directions, thus further deteriorating the visibility.

For alleviating the above problem, according to a vehicle periphery monitoring apparatus described in Patent Document 1, by multiple photographing means having mutually overlapped photographing areas, images of the periphery of a self vehicle are photographed. Then, through transformation of multiple photographed images thus obtained, a plurality of bird's-eye view images are generated and differences among these multiple bird's-eye view images are calculated. With this, in the overlapped areas, there are determined agreement areas where the images are in agreement and non-agreement areas wherein the images are not in agreement. Then, an output image is generated through synthesis of the agreement areas and the non-agreement areas by a plurality of techniques to be displayed for a driver. By generating the output image synthesis of the agreement areas and the non-agreement areas by a plurality of techniques, an attempt is made to resolve the poor visibility of the image in the overlapped area. However, in the bird's-eye view image thus generated, the boundary between the overlapped area and the non-overlapped area is not recognizable. Hence, it is difficult to judge with which camera an image of an object located in the overlapped area was photographed. As a result, there arises inconvenience of difficulty in grasping the position of the object (obstacle) appearing in the overlapped area.

Patent Document 2 discloses a vehicle periphery monitoring apparatus having a function of drawing a join masked pattern (indicated by a bold straight line in the illustration) at a join portion which is formed at the time of synthesis of two photographed images obtained by adjacent cameras and a function of generating an average image through alternate selection of mutually corresponding pixels for the pixels of overlapped areas of two photographed images.

Moreover, Patent Document 2 describes a further function of flashing ON/OFF this join masked pattern for calling the driver's attention when an obstacle detection sensor of ultrasonic type has detected an obstacle in the join portion. That is, as the join portion is masked as a dead spot in the photographed image, no bird's-eye view image is displayed of this join portion. Therefore, in case no obstacle detection sensor is provided, the driver cannot visually recognize an obstacle present in the join portion on the monitor screen. Further, even when an obstacle detection sensor is provided, since the arrangement provides only flashing on/off the join masked pattern, it is difficult for the driver to recognize the obstacle present in the join portion on the monitor screen.

PRIOR ART DOCUMENTS

Patent Documents

Patent Document 1: Japanese Unexamined Patent Application Publication No. 2007-27948 (paragraphs [0011-0057], FIG. 8)

Patent Document 2: Japanese Unexamined Patent Application Publication No. 2003-169323 (paragraphs [0026-0052], FIG. 5, FIG. 6)

SUMMARY OF INVENTION

Technical Problem

A bird's-eye view image of vehicle periphery is obtained by forming bird'-eye view image segments through viewpoint transformation process of photographed images to an upward viewpoint and then synthesizing these bird's-eye view image segments. With execution of the viewpoint transformation process, an object located in a same photographic plane such as a road surface can be converted uniformly into an image that gives no feeling of unnaturalness. Whereas, in the case of an object having a height rising from the photographic plane, this is subject to a transformation different from that provided on an object located in the photographic plane. Therefore, in case a boundary indicator indicating the boundary between respective bird's-eye view image segments, there occurs sudden change in the appearance of the object across the boundary indicator, which change causes unnaturalness. In particular, in the case of a narrow elongate three-dimensional object, even its complete disappearance thereof can occur adjacent the boundary. Further, in case the synthesis of the overlapped areas is effected, the degree of disappearance of such 3D object will be lessened. However, as the projection image of the object will be elongated in the respective photographing directions, thus appearing in twofold, unnaturalness occurs again. Further, in case the data amounts of the overlapped areas to be merged are large, the calculation load for the merger process will be large, and the processing period will be long.

In view of the above-described state of the art, there is a need for a vehicle periphery monitoring system that facilitates driver's monitoring of vehicle periphery by displaying a bird's-eye view image having continuity such as a panoramic image and that also facilitates recognition of an object appearing in overlapped areas of bird's-eye view image segments generated from multiple photographed images.

Solution to Problem

A vehicle periphery monitoring system according to the present invention comprises:

a bird's-eye view image generation section generating bird's-eye view image segments from multiple photographed images photographed to be partially overlapped in a vehicle circumference direction;

a boundary indicator addition section adding a boundary indicator indicating a boundary area of the bird's-eye view image segments adjacent each other to an overlapped area of the bird's-eye view image segments;

a merger section generating a merged overlapped image by merging mutually overlapped areas of the bird's-eye view image segments according to a preset merger relationship;

a displaying bird's-eye view image generation section generating a merged bird's-eye view image containing a boundary-added bird's-eye view image having the boundary indicator and the merged overlapped image as a displaying bird's-eye view image;

a displaying section displaying the displaying bird's-eye view image; and a displaying image determination section displaying the merged bird's-eye view image in the displaying section after displaying the boundary-added bird's-eye view image therein.

With this configuration, as the displaying bird's-eye view image to be displayed in the displaying section, there are prepared two kinds: the boundary-added bird's-eye view image and the merged bird's-eye view image. The boundary-added bird's-eye view image includes a boundary indicator indicating a boundary area between the respective photographed images. As this boundary indicator, a boundary line clarifying the allotment of each photographed image in the bird's-eye view image will be suitable. On the other hand, the merged bird's-eye view image is generated by synthesizing the bird's-eye view image segments generated from the respective photographed images with merging the overlapped areas thereof with each other. Therefore, this merged bird's-eye view image is a continuous image like a panoramic image. Further, since the merged bird's-eye view image is displayed after the boundary-added bird's-eye view image is displayed, the driver can first put into his/her mind the boundary of the photographing direction with reference to the boundary-added bird's-eye view image. Then, under this condition, with switchover of displaying from the boundary-added bird's-eye view image to the merged bird's-eye view image, the driver can now monitor the vehicle periphery easily with reference to the merged bird's-eye view image having continuity such as the panoramic image. Moreover, as the boundary of the photographing direction in the bird's-eye view image is still in the driver's memory, the driver can also understand easily the photographing direction of an object appearing in the overlapped area.

According to one preferred embodiment of the present invention, the boundary-added bird's-eye view image is generated as the overlapped area in the boundary-added bird's-eye view image appropriates the overlapped area of one bird's-eye view image segment; and the merged bird's-eye view image is generated as this overlapped area is replaced by the merged overlapped image generated by the merger section.

With this configuration, firstly, the boundary-added bird's-eye view image that can be generated through simple synthesis and viewpoint transformation process is displayed, in the course of which a mapping table for the merged overlapped bird's-eye view image can be generated. For this reason, in case a transformation table for use in the bird's-eye view image transformation and the merger process is generated on each occasion of system startup, there can be obtained time for the calculation of the merger process at the time of startup. As a result, there is obtained an advantage of no necessity for costly high-speed calculating unit or a large-capacity ROM.

Moreover, in case the merger process calculation can be executed at a sufficiently high speed, it is important to secure a period of time for allowing the driver to view the boundary-added bird's-eye view image appropriately long enough, rather than displaying the merged bird's-eye view image in place of the boundary-added bird's-eye view image as the displaying bird's-eye view image simultaneously with generation of the merged overlapped bird's-eye view image. To this end, preferably, the displaying image determination section is configured to display the merged bird's-eye view image as the displaying bird's-eye view image after lapse of a period set after displaying of the boundary-added bird's-eye view image as the displaying bird's-eye view image.

According to one preferred embodiment proposed for allowing the switchover of displaying from the boundary-added bird'-eye view image to the merged bird's-eye view image as the displaying bird's-eye view image to proceed smoothly and without giving any unnatural feeling, displaying is started from displaying of the boundary-added bird'-eye view image and then switched over to displaying of the merged overlapped image progressively and concentrically from vicinity of the vehicle. Generally, an in-vehicle camera for obtaining a photographed image of vehicle periphery is mounted at a circumferential edge end of the vehicle. Therefore, the switchover of the overlapped area of the bird's-eye view image concentrically from vicinity of vehicle is a visually smooth image switchover.

According to another embodiment, in switchover from displaying of the boundary-added bird's-eye view image to displaying of the merged overlapped image, displaying is switched over sequentially from displaying of an area of the boundary indicator to displaying of the merged overlapped image. In association with the shift from the boundary-added bird's-eye view image to the merged bird's-eye view image, the boundary indicator will disappear. In the above embodiment, however, after the image switchover starts from the image area of this boundary indicator, the merged overlapped area will progressively increase. So that, there is provided an advantage of readiness of recognition of the position of the boundary indicator which is desired to be kept in the driver's memory.

In the switchover from the condition of the boundary-added bird's-eye view image being displayed to the condition of the merged overlapped image, what is desired to be kept in the driver's memory is the portion or section in the boundary-added bird's-eye view image with the boundary indicator which was displayed in the finally displayed merged bird's-eye view image. Therefore, it is advantageous if the boundary indicator is displayed with emphasis in a display switchover process from displaying of the boundary-added bird's-eye view image to displaying of the merged bird's-eye view image as the displaying bird's-eye view image.

Further, in order to "hint" the presence of boundary in some form in the merged bird's-eye view image also, the merged bird's-eye view image switched from the boundary-added bird's-eye view image too may be provided with a boundary indicator in some displaying form different from the displaying form of the boundary indicator in the displaying bird's-eye view image. As the boundary indicator (boundary line) in the displaying form to be added to the boundary-added bird's-eye view image, a semi-transparent line, a dotted line, a partial line indicating only a portion of the boundary line will be preferable. Or, a displaying form combining the above may be employed also.

As a preferred embodiment for speedily generating the boundary-added bird's-eye view image, in generating the overlapped area where the multiple bird's-eye view image segments are overlapped with each other, rather than using a calculation process such as the merger process, a different arrangement may be proposed which does not effect the merger process for the overlapped area by employing a corresponding area of either one bird's-eye view image segment as it is or as each bird's-eye view image segment shares its respective part of its own.

Further, with use of an arrangement of displaying the boundary-added bird's-eye view image after startup of the vehicle periphery monitoring system, when the boundary-added bird's-eye view image is viewed, the boundary of the photographing direction in the bird's-eye view image will still be kept in memory advantageously even after the switchover of the display screen to the merged overlapped bird's-eye view image.

DESCRIPTION OF EMBODIMENTS

Figure 1:
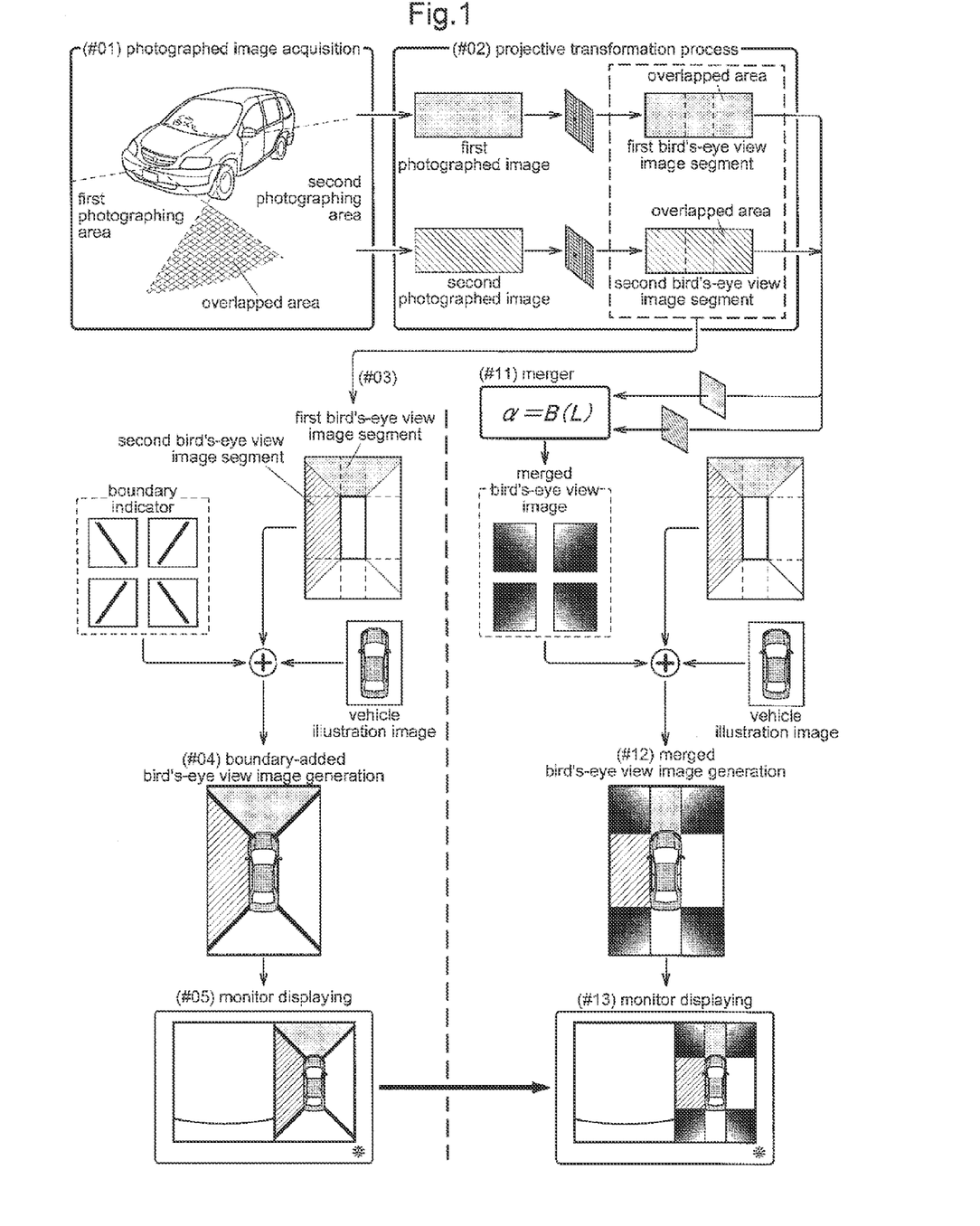
[FIG. 1] is a diagram illustrating a process in which a displaying bird's-eye view image is generated by synthesizing bird's-eye view image segments generated from photographed images of a vehicle periphery area in such a manner as to superimpose mutually overlapped areas thereof.

Before explaining specific embodiments of a vehicle periphery monitoring system according to the present invention, its basic principle will be explained. FIG. 1 schematically illustrates a process in which a displaying bird's-eye view image is generated by synthesizing bird's-eye view image segments generated from multiple photographed images which captured a scene of vehicle periphery in such a manner as to be partially overlapped with each other, with superimposing the mutually overlapped areas thereof. The forms of the displaying bird's-eye view image to be finally displayed on a displaying section (monitor) are two kinds: a boundary-added bird's-eye view image and a merged bird's-eye view image.

Incidentally, there are normally employed at least four cameras of front, rear and left and right sides, so that the displaying bird's-eye view image may include a peripheral region of an entire circumference of the vehicle. Through combining bird's-eye view image segments generated from four photographed images obtained by the respective cameras, a whole-periphery bird's-eye view image is generated as a basic bird's-eye view image of the displaying bird's-eye view image. In FIG. 1, for avoiding complexity of illustration, the arrangement is simplified to a process of generating a displaying bird's-eye view image from a first photographed image and a second photographed image obtained by the front camera (this will be referred to as the "first camera") and the left side camera (this will be referred to as the "second camera"). From this FIG. 1 and the accompanying description thereof, the generation process of the whole-periphery bird's-eye view image around the vehicle can be readily presumed.

For the generation of the displaying bird's-eye view image, firstly, the vehicle periphery is photographed by the in-vehicle cameras. In the case of the arrangement shown in FIG. 1, the vehicle periphery is photographed by the first camera which photographs the front side of the vehicle as its photographing range and the second camera which photographs the left side of the vehicle as its photographing range (#01). Then, with using the first photographed image obtained by the first camera and the second photographed image obtained by the second camera, there is effected a projective transformation process with setting a projection plane parallel with a road surface, namely, a viewpoint transformation with setting the virtual viewpoint immediately upwards (#02). Through this projective transformation process, there are obtained, from the respective photographed images, a first bird's-eye view image segment and a second bird's-eye view image segment, which are bird's-eye view images immediately above the vehicle of the photographing ranges thereof (#03).

The first camera and the second camera are set so as to have a mutually overlapped area (an overlapped photographing range). As a result, the first photographed image and the second photographed image each contain an overlapped area and also the first bird's-eye view image segment and the second bird's-eye view image segment too contain the overlapped area. In order to obtain a bird's-eye view image of the vehicle periphery by the first camera and the second camera, the first bird's-eye view image segment and the second bird's-eye view image segment are synthesized each other in such a manner that the mutually overlapped areas thereof are superimposed. Incidentally, this synthesis process differs between the case of generating the boundary-added bird's-eye view image and the case of generating the merged bird's-eye view image.

One method of generating the boundary-added bird's-eye view image is a method of applying directly the overlapped area of either one of the first photographed image and the second photographed image. Another method is applying the overlapped area of the first photographed image to the region on the side of the first photographed image and applying the overlapped area of the second photographed image to the region on the side of the second photographed image, respectively, with setting a bisector of the overlapped areas as the border therebetween. That is, in the latter case, no merger (blending) process is effected, but the overlapped area is created by e.g. simple patching-up of images. Both of these methods involve only movement of image, thus can be processed at a high speed. A synthesized image obtained by the synthesis of the bird's-eye view image segments above is then added with a vehicle illustration image and a boundary indicator (s).

The vehicle illustration image is generated and prepared in advance based on a photo or an illustration of the vehicle as seen from the above. The boundary indicator is used for indicating, in the overlapped area on the displaying bird's-eye view image, the boundary area between the first bird's-eye view image segment and the second bird's-eye view image segment. For instance, it is possible to employ a form of a boundary line that bisects the overlapped area. With the addition of the vehicle illustration image and the boundary indicator to the synthesized image of the bird's-eye view image segments, a boundary-added bird's-eye view image is generated (#04). This boundary-added bird's-eye view image is displayed firstly on the monitor as an initial image of the displaying bird's-eye view image (#05).

When the merged bird's-eye view image is to be generated as the displaying bird's-eye view image, the mutually overlapped areas of the first bird's-eye view image segment and the second bird's-eye view image segment are merged (blended) with a predetermined merger ratio (#11). For each overlapped area, if a pixel nearer a photographic centerline is considered as a more important pixel for creating a clear photographic image, then, it will be advantageous that a pixel located at a position near the photographic centerline of the first camera and far from the photographic centerline of the second camera should retain a larger degree of the characteristics of the pixel of the first bird's-eye view image segment. Conversely, a pixel located at a position near the photographic centerline of the second camera and far from the photographic centerline of the first camera should retain a larger degree of the characteristics of the pixel of the second bird's-eye view image segment. On the other hand, in order to obtain an overlapped area image having better visibility, an area of averaging the pixel components of the first bird's-eye view image segment and the second bird's-eye view image segment is needed as well.

In order to realize the above, with using a merger function: B represented by the following formula, a merger ratio: a between the first bird's-eye view image segment and the second bird's-eye view image segment is derived.

$$\alpha = B(L)$$

in the domain of definition: $0 < L \le a$, B increases at an average change rate or a fixed change rate $\lambda 1$;

in the domain of definition: $b < L \le$ maximum value, B increases at the average change rate or a fixed change rate $\lambda 3$; and in the domain of definition: $a < L \le b$, B increases at a predetermined change rate $\lambda 2$ which is smaller than $\lambda 1$ or $\lambda 3$ or remains constant.

where, L is a distance from a viewing limit line of each camera or from a respective photographing centerline or an angle about a viewing limit line intersection point. In this detailed disclosure, a term: "a photographic deviation" will be used as a generic term for these. For instance, if the overlapped area is a plane rectangular coordinate system, a position of a pixel of interest will be represented by a distance p1 from a first viewing limit line and a distance p2 from a second viewing limit line; thus, L=p1/p2. Further, the overlapped area will be represented by a polar coordinate and if the angle of deviation of the pixel of interest is θ, then L=θ.

With using the merger ratio derived from the above-described function, the overlapped areas of the first bird's-eye view image segment and the second bird's-eye view image segment are merged. And, with using the resultant merged overlapped area, the first bird's-eye view image segment and the second bird's-eye view image segment, a merged bird's-eye view image is generated (#12) The merged bird's-eye view image is then displayed on the monitor, with its overlapped area being replaced by the merged overlapped area relative to the boundary-added bird's-eye view image (#13).

Figure 2:
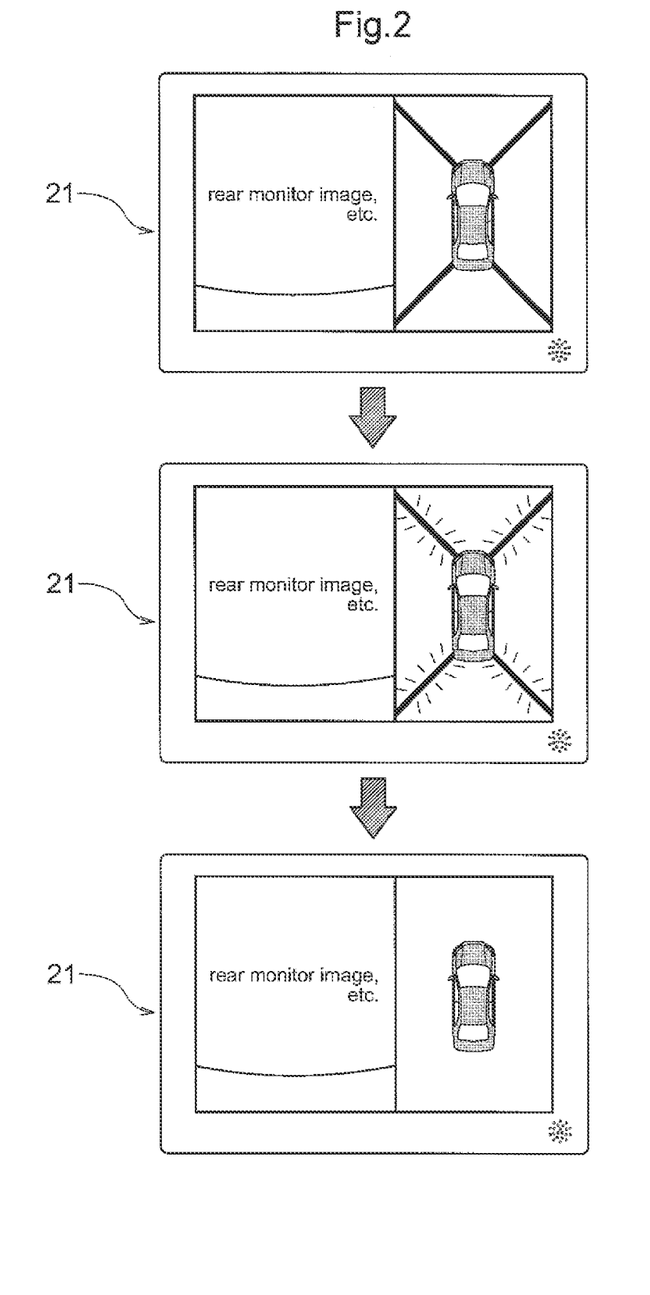
[FIG. 2] is a diagram illustrating that a boundary-added bird's-eye view image and a merged bird's-eye view image are displayed respectively as a displaying bird's-eye view image with a time lag therebetween.

That is, with the vehicle periphery monitoring system according to the present invention, as shown in FIG. 2, as the displaying bird's-eye view image to be displayed on the monitor, the boundary-added bird's-eye view image is displayed first, and thereafter, the merged bird's-eye view image is displayed.

Figure 3:
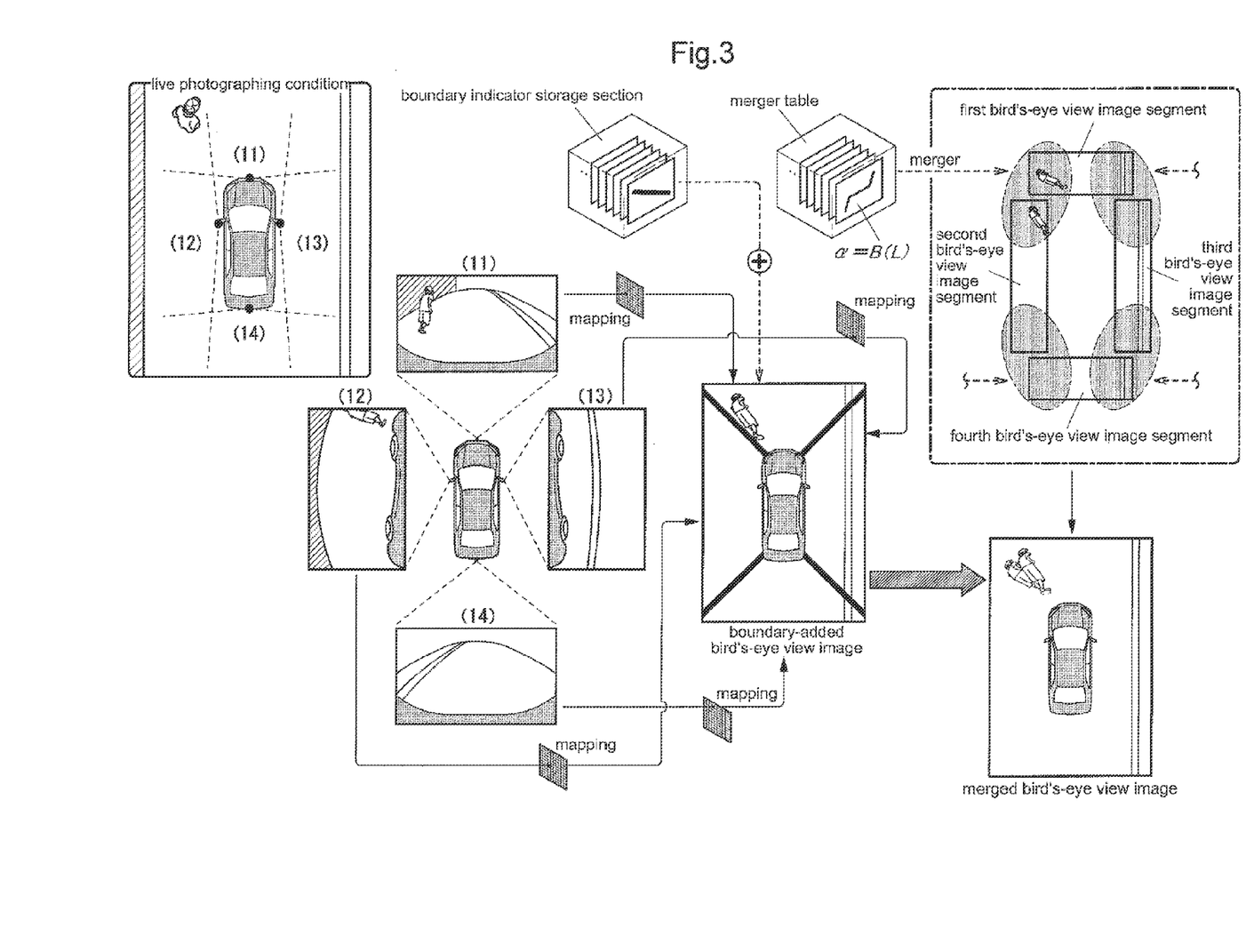
[FIG. 3] is a diagram illustrating a generation process of a whole-periphery bird's-eye view image to be displayed on a monitor at the time of a parallel parking of a vehicle mounting an example of the vehicle periphery monitoring system according to the present invention.
Figure 4:
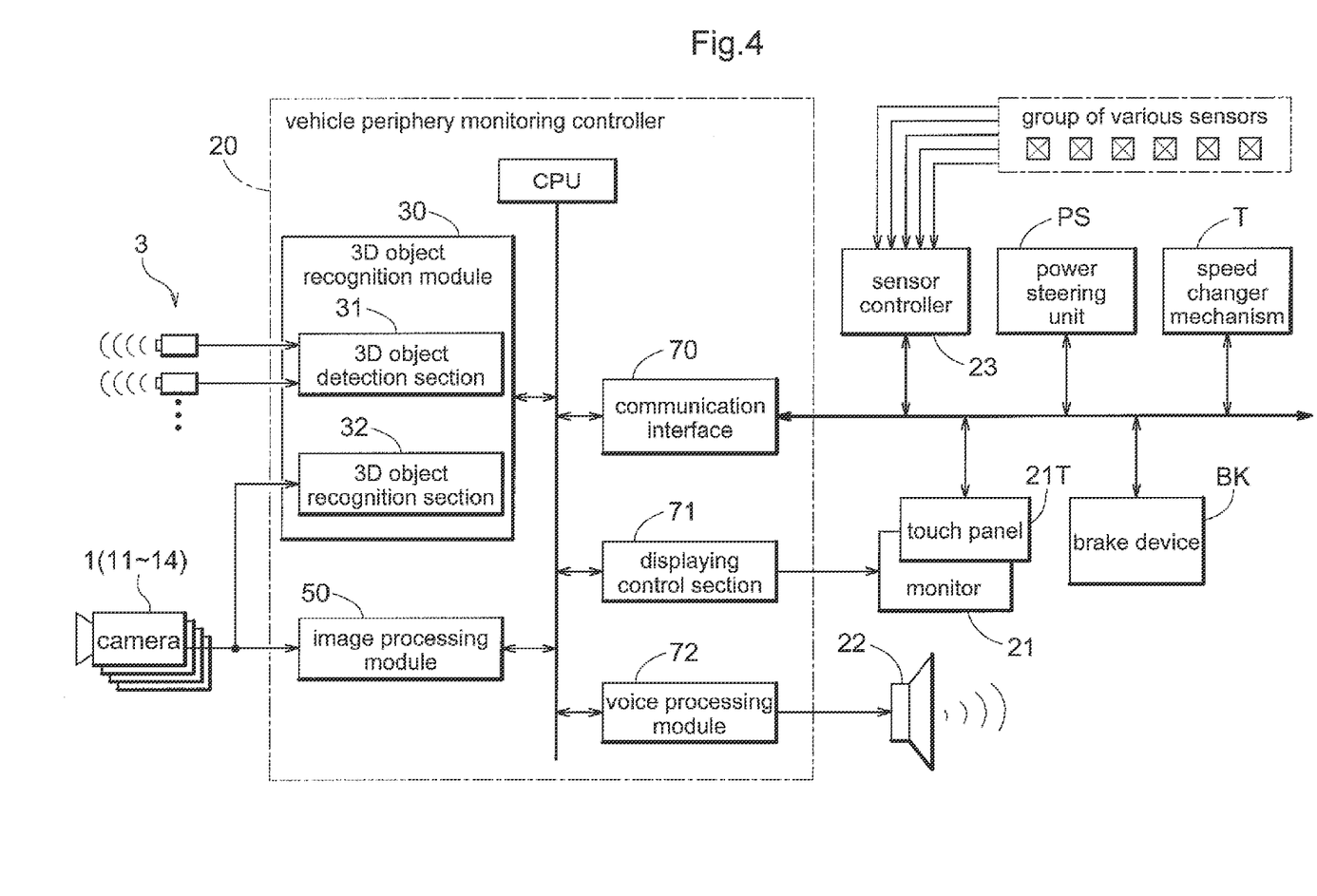
[FIG. 4] is a functional block diagram of the vehicle periphery monitoring system.
Figure 5:
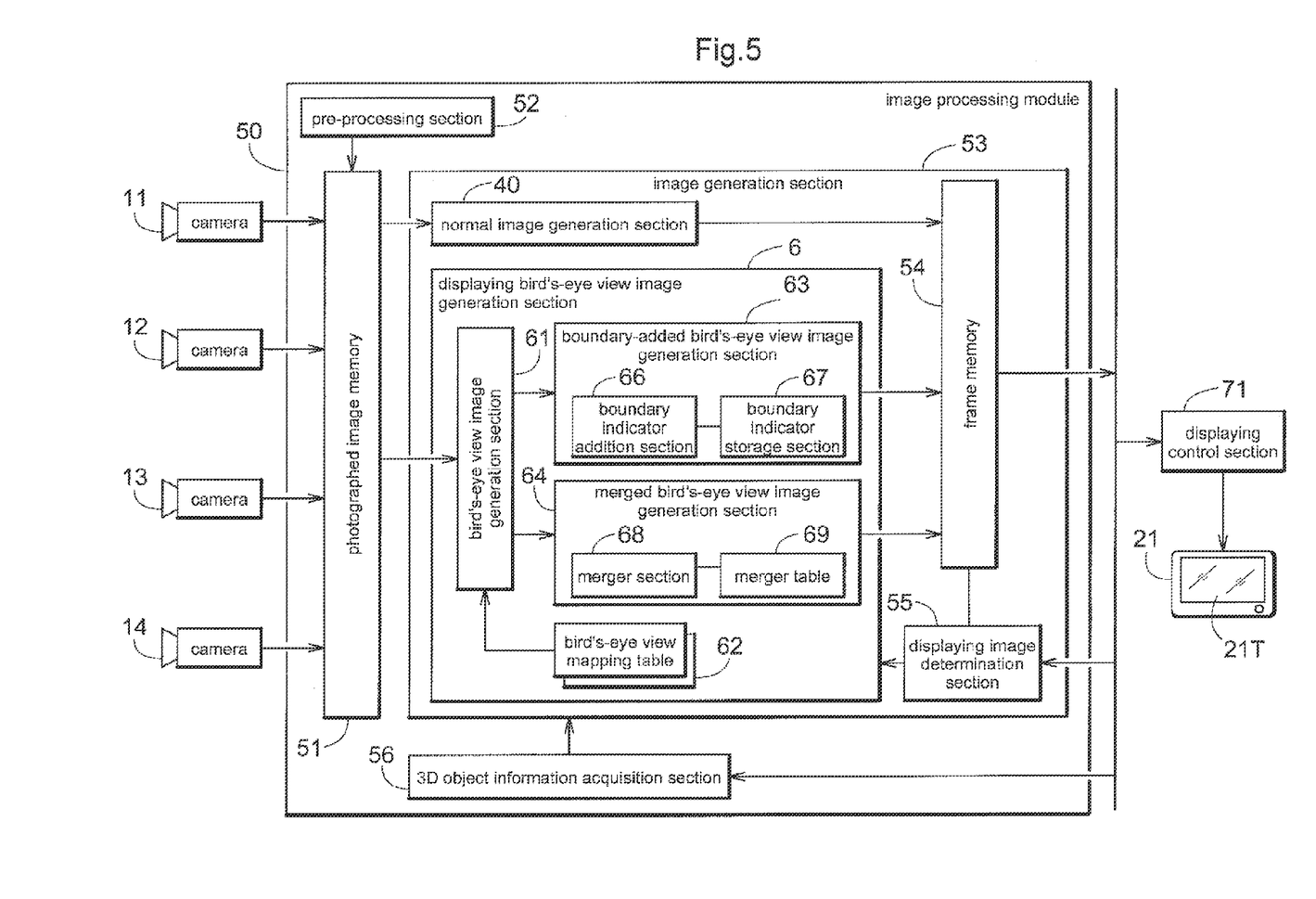
[FIG. 5] is a functional block diagram of an image processing module for generating various displaying images including bird's-eye view images from photographed images.

Next, specific embodiments of the present invention will be explained with reference to the drawings. FIG. 3 is a diagram illustrating a generation process of a whole-periphery bird's-eye view image to be displayed on a monitor at the time of a parallel parking of a vehicle mounting an example of the vehicle periphery monitoring system according to the present invention. FIG. 4 is a functional block diagram of the vehicle periphery monitoring system. FIG. 5 is a functional block diagram of an image processing module for generating various displaying images including bird's-eye view images from photographed images.

With the vehicle periphery monitoring system according to this embodiment, from photographed images obtained by four in-vehicle cameras, i.e. a front camera (first camera) 11, a left side camera (second camera) 12, a right side camera (third camera) 13, and a rear camera (fourth camera) 14, there is generated a displaying bird's-eye view image covering the whole periphery of the vehicle and this image is displayed on the monitor. In the following discussion, these in-vehicle cameras 11, 12, 13, 14 will be generically referred to simply as "camera 1". As the displaying bird's-eye view image, there are generated a boundary-added bird's-eye view image and a merged bird's-eye view image. At the time of start of this vehicle periphery monitoring by the whole periphery bird's eye view image, first, the boundary-added bird's-eye view image is displayed on the monitor and with a time lag of a few seconds thereafter, in place of the boundary-added bird's-eye view image, the merged bird's-eye view image is displayed thereon.

The camera 1 is a digital camera using an image pickup device such as a CCD (charge coupled device) or a CIS (CMOS image sensor) to capture two-dimensional images at the rate from 15-30 frames per second over time and effect a digital conversion to output their photographed images in real time. The camera 1 has a wide-angle lens which ensures a view angle of about 180 degrees in the horizontal direction and is mounted on the vehicle with its optical axis being provided with a depression angle of about 30 degrees.

In the generation process of the bird's-eye view images, a front photographed image (first photographed image) captured by the front camera 11 is projection-transformed into a front area image (first bird's-eye view image segment) of the whole periphery bird's-eye view image from immediately above the vehicle. Similarly, a left photographed image (second photographed image) captured by the left side camera 12, a right photographed image (third photographed image) captured by the right side camera 13 and a rear photographed image (fourth photographed image) captured by the rear camera 4 are projection-transformed respectively into a left area image (second bird'-eye view image segment), a right area image (third bird's-eye view image) and a rear area image (fourth bird's-eye view image). In this, the projective transformations are effected with using mapping tables. Each of these mapping tables is configured to provide a projective transformation with a projection plane being set parallel with the road surface.

The boundary-added bird's-eye view image is generated by synthesizing the first through fourth bird's-eye view image segments with their overlapped areas being superimposed each other and the overlapped area being provided with a boundary indicator indicating the boundary between the photographic fields of vision of two corresponding cameras. In this case, the boundary indicator comprises a boundary line which bisects the overlapped areas obliquely. Therefore, the shape of each of the four bird's-eye view image segments is isosceles trapezoid.

The merged bird's-eye view image is similar to the boundary-added bird's-eye view image in that the first through fourth bird's-eye view image segments are synthesized with their overlapped areas being superimposed each other, but differs from the boundary-added bird's-eye view image in that the overlapped area is generated by merging the corresponding pixels of the respective bird's-eye view image segments with a predetermined merger ratio. In the instant embodiment, for each pixel, a merger ratio: a can be read out with using a merger table produced based on the above-described merger function: $\alpha = B(L)$. This merger table is a table structure configured to output a merger ratio: $\alpha$ with using a photographic deviation L of a pixel to be merged as an input parameter.

When a plane rectangular coordinate or a polar coordinate whose origin is set at the corner of the overlapped area represented as a rectangle which corner is nearest the vehicle is considered, the photographic deviation: L can be represented by combination of an X coordinate value and a Y coordinate value or the declination. Here, the basic characterizing feature of this merger function is that when its definition domain is divided into three definition domains, i.e. a first definition domain, a second definition domain and a third definition domain, in the first and third definition domains, the function provides a value which increases monotonically and provides a fixed value of about 50% in the second definition domain. The 50% merger ratio means averaging of the pixels of one bird's-eye view image segment and the pixels of the other bird's-eye view image segment.

Inside the vehicle, there is mounted a vehicle periphery monitoring controller 20 which constitutes the "core" of the vehicle periphery monitoring system. This vehicle periphery monitoring controller 20 includes a microprocessor or a DSP (digital signal processor). The vehicle periphery monitoring controller 20 further includes a communication interface 70 as an input/output interface. The communication interface 70 employs an in-vehicle LAN as a data transmission line, and to this interface 70, there are connected a monitor 21 as a displaying section for displaying various information, a touch panel 21T as an input device and a sensor controller 23, the sensor controller 23 configured to transmit signal inputs from a group of vehicle condition detection sensors directly as they are or transmit them after evaluations thereof to other controllers, so that the above components can transmit data to the interface 70. Further, this in-vehicle LAN includes units of controllers for controlling a power steering unit PS, a speed changer mechanism T, a brake device BK, etc.

The group of vehicle condition detection sensors connected to the sensor controller 23 detect a driving operation and various conditions of vehicle travel. The vehicle condition detection sensors group includes, though not shown, a steering sensor for detecting a steering operational direction (steering direction) and a steering operational amount (steering amount), a shift position sensor for determining a shift position of a shift lever, an accelerator sensor for determining an operational amount of an accelerator, a brake sensor for detecting an operational amount of a brake pedal, a distance sensor for detecting a traveling distance of the self vehicle, etc.

In addition to the above, the vehicle periphery monitoring controller 20 includes, as various functional sections embodied in the form of hardware and/or software, a 3D (three-dimensional) object recognition module 30 for recognizing a 3D object present in the vehicle periphery, an image processing module 50, a display control module 71, and a voice processing module 72. A monitor displaying image generated at the image processing module 50 is converted into video signals at the display control module 71 and then sent to the monitor 21. A voice guide or an alarm sound at the time of emergency etc. generated at the voice processing module 72 will be outputted via a speaker 22.

The 3D object recognition module 30 includes a 3D object detection section 31 for effecting 3D object detection through evaluation of detection signals from multiple ultrasonic sensors 3 and a 3D object recognition section 32 for effecting 3D object recognition with using photographed images from the in-vehicle cameras 1. The ultrasonic sensors 3 are disposed at opposed ends and the center of the front portion, the rear portion, the left side portion and the right side portion of the vehicle and are capable of detecting objects (obstacles) present nearby the vehicle periphery through reflected waves therefrom. Through processing of the return period, amplitude or the like of the reflected wave of each ultrasonic sensor 3, the distance from the vehicle to the object as well as the size of the object can be inferred. Also, through processing over time of the detection results of all the ultrasonic sensors 3, the movement or the outer shape in the horizontal direction of the object can be inferred as well.

The 3D object recognition section 32 mounts an object recognition algorithm which per se is known and recognizes a 3D object in the vehicle periphery from inputted photographed images, in particular, chronologically continuous series of photographed images. For the detection of 3D object, only either one of the 3D object detection section 31 and the 3D object recognition section 32 can be provided. However, through cooperative operations of both the 3D object recognition section 32 superior for the detection of shape of 3D object and the 3D object detection section 31 superior for calculation of the distance to 3D object, i.e. the position of 3D object, more accurate 3D object recognition is made possible. The 3D object recognition module 30 outputs 3D object attribute information describing the position, posture, size, color tone, etc. of the recognized 3D object. As the 3D object detection section 31, it is also possible to employ other 3D object detection device using laser radar.

FIG. 5 shows a functional block diagram of the image processing module 50 of the vehicle periphery monitoring controller 20. The image processing module 50 has a function of generating a displaying image to be displayed on the monitor 21, through processing photographed images obtained by the cameras 1 for photographing the vehicle periphery.

The image processing module 50 includes a photographed image memory 51, a pre-processing section 52, an image generation section 53, a frame memory 54, a displaying image determination section 55 and a 3D object information acquisition section 56. Photographed images obtained by the cameras 1 are mapped in the photographed image memory 51 and the pre-processing section 52 adjusts luminance balance, color balance, etc. between the photographed images. The displaying image determination section 55 determines timing for a displaying image generated by the image generation section 53 to be displayed on the monitor 21. The 3D object information acquisition section 56 receives the 3D object information outputted from the 3D object recognition module 30 and reads out various attribute information (data) such as the position, size, color, posture of the 3D object described in this 3D object information.

The image generation section 53 includes a normal image generation section 40 and a displaying bird's-eye view image generation section 6. The normal image generation section 40 adjusts the image quality of a photographed image to a quality suitable for this image to be displayed as it is on the monitor. The vehicle periphery image to be monitor-displayed can be one selected by the driver from the photographed images obtained by the front camera 11, the left side camera 12, the right side camera 13 and the rear camera 14 or can also be a combination of multiple photographed images.

The displaying bird's-eye view image generation section 6 includes a bird's-eye view image generation section 61, a bird's-eye view image mapping table 62, a boundary-added bird's-eye view image generation section 63, and a merged bird's-eye view image generation section 64. The section 6 generates respective bird's-eye view image segments from the multiple photographed images and combines these bird's-eye view image segments in such a manner as to superimpose respective overlapped areas thereof each other, thus generating a displaying bird's-eye view image. As the displaying bird'-eye view image, there are generated a boundary-added bird's-eye view image added with a boundary indicator indicating the boundary area (boundary area of the photographed images) of the camera views corresponding to the overlapped area and a merged bird's-eye view image having an overlapped area which merges the corresponding areas of the two bird's-eye view image segments with a preset merger relationship.

The bird's-eye view image generation section 61 generates a bird's-eye view image of the vehicle periphery centering around the vehicle through viewpoint transformation (projective transformation) of the photographed images mapped in the photographed image memory 51. In the instant embodiment, the bird's-eye view image generation section 61 generates bird's-eye view image segments by effecting a mapping transformation using the projective transformation tables stored in the bird's-eye view mapping table 62 on the photographed images from the respective cameras 1. Various mapping tables for use in the projective transformation above are stored in advance to be selectable. The group comprised of the multiple mapping tables selectively stored and the individual mapping tables are generically referred to as the "bird's eye view image mapping table 62".

The transformation map constituting the bird's-eye view image mapping table 62 describes a correlation between pixel data of a photographed image and pixel data of a bird's-eye view photographed image. For each pixel of photographic pixels of one frame, there is described a destination pixel coordinate in the bird's-eye view photographed image and for each in-vehicle camera, a different map is applied. The first bird's-eye view image segment is generated from the first photographed image from the front camera 11. The second bird's-eye view image is generated from the second photographed image from the left side camera 12. The third bird's-eye view image segment is generated from the third photographed image from the right side camera 13. The fourth bird's-eye view image segment is generated from the fourth photographed image from the rear camera 14. Incidentally, in the case of adopting an arrangement of selectively generating bird's eye view images from different viewpoints, an arrangement will be provided which allows selection of different transformation maps.

When a bird's-eye view image of the whole periphery of the vehicle centering around the vehicle is generated through combination of the first bird's-eye view image segment through fourth bird's-eye view image segment, there are formed four overlapped areas between the adjacent bird's-eye view image segments. The difference between the boundary-added bird's-eye view image generation section 63 and the merged bird's-eye view image generation section 64 resides in the method of image generation of this overlapped area.

The boundary-added bird's-eye view image generation section 63 draws, in this overlapped area, a boundary indicator indicating the boundary of the overlapped photographed images. For instance, since the boundary area of overlapped photographed images is an area which separates the photographic views of the respective images from each other, the centerline of the overlapped areas of the first bird's-eye view image segment and the second bird's-eye view image segment can be considered as the diagonal line (the diagonal line having one end at the left front corner of the vehicle) of this rectangular overlapped area. Therefore, in this case, a bold line having a particular color drawn on the diagonal line of this overlapped area is used as the boundary indicator. Needless to say, a dotted line can be used instead of a bold line or, its shape can be fan shape. As the particular color, black is suitable. However, in case the background has a blackish color, it is preferred to use an easily distinguishable color such as white. The type and the color of the boundary indicator may be selected automatically or can be selectable by the user. To this end, the boundary-added bird's-eye view image generation section 63 includes a boundary indicator addition section 66 for adding a boundary indicator for indicating the boundary area in the overlapped area and a boundary indicator storage section 67 storing image items of such boundary indicator.

The bird's-eye view image generation section 64 applies a merged image (a-blended image) with using the overlapped portion of the two bird'-eye view image segments in this overlapped area. To this end, the merged bird'-eye view image generation section 64 includes a merger section 68 for generating a merged overlapped image through merger of the overlapped areas of the bird's-eye view image segments with a preset merger relationship, and a merger table 69 which stores such merger relationships in the form of table. Although the merger (α-blending) process per se is well-known, the merger process employed in the present invention employs the following merger relationship suitable for overlapped areas of bird's-eye view images, in view of the special condition, i.e. a bird's-eye view image with viewpoint transformation from photographed images.

The essence of this merger relationship is that a pixel having a position extremely near the photographic centerline of one of the two cameras producing the overlapped area is provided with an emphasis on the pixel in the bird'-eye view image segment of that one camera and a pixel having a position extremely near the photographic centerline of the other of the two cameras producing the overlapped area is provided with an emphasis on the pixel in the bird'-eye view image segment of the other camera. More importantly, the remaining pixels will be provided with the average of both the bird's-eye view image segments.

The merger relationship above can be represented in a general merger relationship: B, $$\alpha=B(L).$$

where α is the merger ratio between one bird's-eye view image segment and the other bird's-eye view image segment and L represents the photographic deviation.

Moreover, this merger function differs in the following three definition domains.

(1) in the definition domain: $0<L \leq a$, B increases at a predetermined change rate $\lambda 1$;

(2) in the definition domain: $b<L \leq$ maximum value, B increases at the average change rate or a predetermined change rate $\lambda 3$; and (3) in the definition domain: $a<L \leq b$, B increases at a predetermined change rate $\lambda 2$ which is smaller than $\lambda 1$ or $\lambda 3$ or remains constant.

The boundary-added bird's-eye view image generated by the boundary-added bird's-eye view image generation section 63 and the merged bird's-eye view image generated by the merged bird's-eye view image generation section 64 are forwarded to the frame memory 54. The boundary-added bird's-eye view image is generated by simple patching-up of images, hence, generated within a period much shorter than the merged bird's-eye view image. Further, the boundary-added bird's-eye view image has the function of causing the driver to grasp the photographic field of each camera in the vehicle periphery bird's-eye view image centering around the vehicle though the boundary indicator. Therefore, it is important that the boundary-added bird's-eye view image be displayed on the monitor 21 (a few seconds) prior to the merged bird's-eye view image. This provides another advantage that the merged bird's-eye view image is generated while the boundary-added bird's-eye view image is being displayed. Hence, the displaying image determination section 55 transmits, at appropriate timings, the boundary-added bird's-eye view image and the merged bird's-eye view image forwarded to the frame memory 54 as displaying bird's-eye view images to the display control section 71 to be displayed on the monitor 21.

Figure 6:
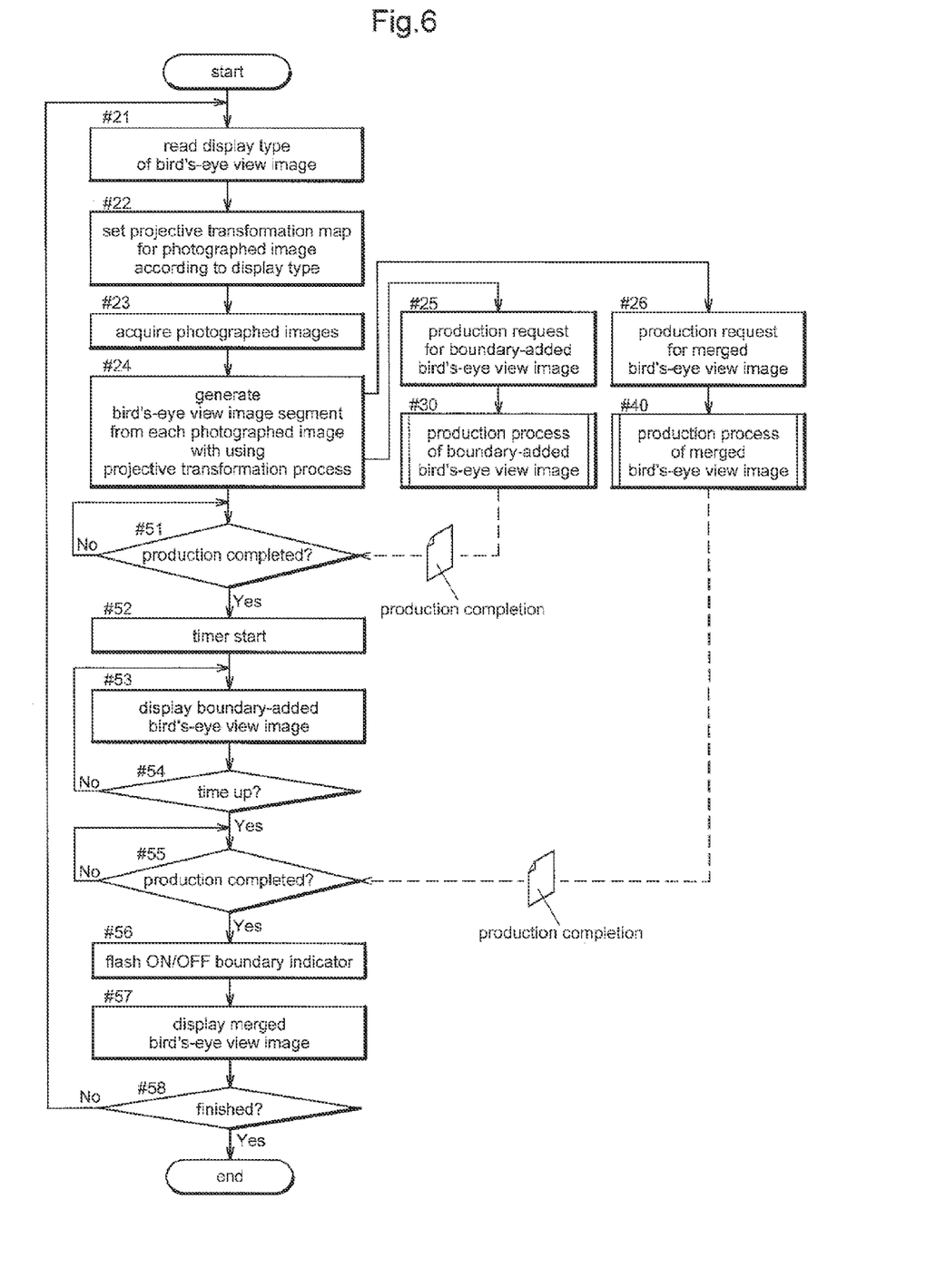
[FIG. 6] is a flowchart illustrating a process of a bird's-eye view image by the vehicle periphery monitoring system.

Next, a flow of bird's-eye view image displaying by the vehicle periphery monitoring system configured as described above will be explained with reference to the flowchart shown in FIG. 6.

Upon start of a bird's-eye view image displaying routine for monitoring the vehicle periphery, firstly, the process reads out a display type for the bird's-eye view image set manually by the driver as desired or default-set (#21). Here, display type for the bird's-eye view image is set for prescribing photographed images for use and the position of virtual viewpoint for use in generating the bird's-eye view image of the vehicle periphery, the layout of the generated bird's-eye view image on the monitor screen, etc. Then, in accordance with a read display type of the bird's-eye view image, maps to be used for projective transformations at the bird's-eye view image generation section 61 are set at the bird's-eye view mapping table 62. In here, photographed images of the four in-vehicle cameras 1 are obtained (#23). Subsequently, the boundary-added bird's-eye view image generation section 63 is given a generation process request for a boundary-added bird's-eye view image using the generated first through fourth bird's-eye view image segments (#25); and the boundary-added bird's-eye view image generation process according to the basic principle shown in FIG. 1 is executed (#30). Simultaneously, the merged bird'-eye view image generation section 64 is given a generation process request for a merged bird's-eye view image using the generated first through fourth bird's-eye view image segments (#26); and a merged bird's-eye view image generation process based on the basic principle shown in FIG. 1 is executed (#40).

Then, the process determines whether generation of a boundary-added bird's-eye view image is completed or not (#51). This determination is effected with a production completion notice issued by the boundary-added bird's-eye view image generation section 63. Upon completion of generation of the boundary-added bird's-eye view image (YES branching at #51), a timer is started (#52) and the boundary-added bird's-eye view image is displayed on the monitor (#53). Next, the process checks whether the timer has reached a set period (a period of a few seconds) or not (#54) and displaying of the boundary-added bird's-eye view image is continued until lapse of the set period (NO branching at #54). Upon elapse of the set period (YES branching at #54), then, the process checks whether generation of a merged bird's-eye view image is completed or not (#55). This determination is effected with a production completion notice issued by the merged bird's-eye view image generation section 64. Upon completion of the generation of a merged bird's-eye view image (YES branching at #55), firstly, the process flashes ON/OFF the boundary indicator (boundary bold line) in the merged bird's-eye view image for a predetermined period to inform the driver of the displaying being now changed from the boundary-added bird's-eye view image to the merged bird's-eye view image (#56).

Incidentally, the boundary-added bird'-eye view image may be displayed with flashing ON/OFF of the boundary indicator from the beginning, rather than the boundary indicator is flashed ON/OFF immediately before the display change to the merged bird's-eye view image. Next, the merged bird's-eye view image is displayed on the monitor 21, instead of the boundary-added bird's-eye view image (#57). Unless a completion instruction for this bird's-eye view image is issued (NO branching at #58), the process returns to step #21 to repeat this routine.

In the case of the above-described routine, there was explained the control flow according to which the generation and displaying of the boundary-added bird's-eye view image are effected on each occasion of acquisition of new photographed images. In general, however, the generation and displaying of the boundary-added bird's-eye view image are effected only at the time of start of this routine or by a predetermined time interval. More particularly, the generation and displaying of the boundary-added bird's-eye view image are effected when this vehicle periphery monitoring system is started in response to ON of a switch (e.g. an ON switch of the vehicle periphery monitoring system) by the driver or by being triggered by a shift reverse (a speed change operation to reverse travel) or a certain vehicle speed. And, the vehicle periphery monitoring system will generate a merged bird's-eye view image in parallel with or during displaying of the boundary-added bird's-eye view image and will display the merged bird's-eye view image after lapse of a predetermined period. One advantage of this arrangement is that as the boundary-added bird's-eye view image can be displayed immediately after start, no feeling of unnaturalness will be provided to the driver.

[Other Embodiments]

Figure 8:
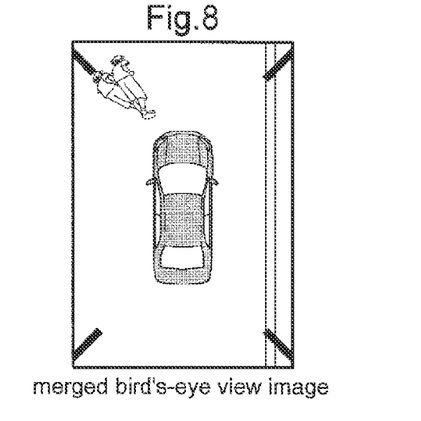
[FIG. 8] is an explanatory view showing a further embodiment of a boundary line as the boundary indicator.
Figure 9:
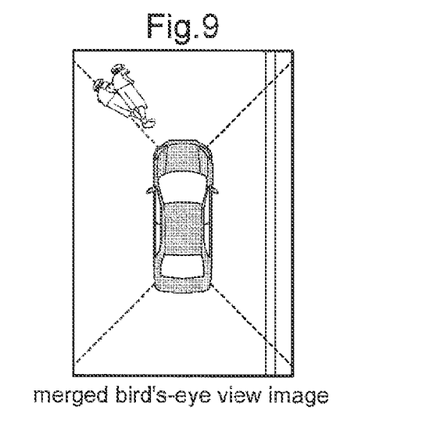
[FIG. 9] is an explanatory view showing a further embodiment of a boundary line as the boundary indicator.

(1) In the foregoing embodiment, as shown in FIG. 2, the boundary-added bird's-eye view image firstly displayed is replaced subsequently by the merged bird's-eye view image having no boundary indicator (boundary line). Instead of this, presence of a boundary indicator (boundary line) may "hinted" in some form in the merged bird's-eye view image also. That is, the bold solid line provided as the boundary indicator in the boundary-added bird's-eye view image in the foregoing embodiment can be provided in various display forms as shown in FIGS. 7 through 9.

Figure 7:
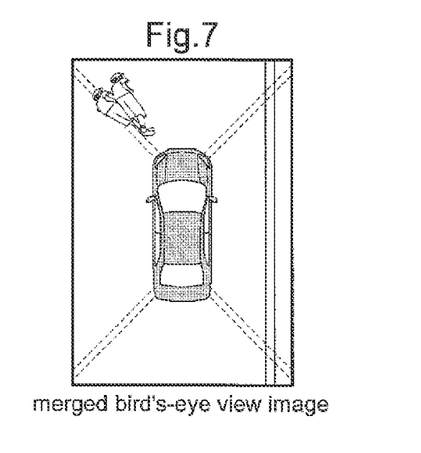
[FIG. 7] is an explanatory view showing a further embodiment of a boundary line as a boundary indicator.

In FIG. 7, the boundary lines are rendered semitransparent. For instance, with providing 50% transparency, visual confirmation of the boundary line and visual confirmation of the merged image of the boundary area are made possible. Further, in FIG. 8, only a portion of the boundary line is displayed, with another portion thereof being deleted. In this case, only the outer end portion of the boundary line is displayed. In other words, it may be said that the length of the boundary indicator (boundary line) in the merged bird's-eye view image is made shorter than the length of the boundary indicator (boundary line) in the boundary-added bird's-eye view image. In this case, it will be advantageous if displaying with emphasis is provided for facilitating visual confirmation in spite of the displayed boundary line being partial. Still further in FIG. 9, the boundary line is shown partial. In this case, it is drawn as a dotted line. Needless to say, the line can be a dotted line having unequal pitch rather than equal pitch. Incidentally, in the cases of FIG. 8 and FIG. 9 too, the boundary lines thereof can be formed semitransparent.

With the above-described arrangements, visual confirmation of the boundary line and the visual confirmation of the merged image of the boundary area in the merged bird's-eye view image are made possible. That is, it becomes possible to inform the user that the vicinity of the area where the boundary line is present in the merged bird's-eye view image is the portion where the photographed images captured by the plurality of cameras were merged with each other.

Further, though not shown, a thin line may be used for hinting the presence of boundary in order to allow visual confirmation of the boundary line and the visual confirmation of the merged image of the boundary area in the merged bird's-eye view image. In particular, in this case, an arrangement wherein the boundary indicator (boundary line) is drawn as a bold line in the boundary-added bird's-eye view image firstly displayed whereas the boundary indicator (boundary line) is drawn as a narrow line in the merged bird's-eye view image subsequently switched therefrom will be effective for the visual confirmation of the boundary line and the visual confirmation of the fused image of the boundary area.

Still further, an arrangement of combining the displaying forms of the boundary indicator (boundary line) shown in FIGS. 7 to 9 with the displaying form of drawing the boundary indicator (boundary line) by a narrow line can be used also. For instance, it is possible to combine all of the displaying modes of the boundary indicator (boundary line) shown in FIGS. 7 through 9 with the displaying form of drawing the boundary indicator (boundary line) by a narrow line. Or, it is also possible to combine each of the displaying modes of the boundary indicator (boundary line) shown in FIGS. 7 through 9 with the displaying form of drawing the boundary indicator (boundary line) by a narrow line.

(2) In the foregoing embodiment, displaying of the boundary-added bird's-eye view image and detection of a 3D object by the 3D object recognition module 30 are effected irrelevantly from each other. Instead of this, when the 3D object information processing section 56 receives 3D object information, depending on the position of this 3D object, the merger function used at the merger section 68 may be changed or the viewpoint position used in generation of the 3D object position bird's-eye view image may be changed.

(3) In the foregoing embodiment, for easy-to-understand explanation of the generation process of the displaying bird's-eye view images, the construction of the displaying bird's-eye view image generation section 6 is provided in the form of blocks for the respective functions. It is understood, however, that these functional blocks are provided only for the sake of explanation and the present invention is not limited to such particular block layout. For instance, the boundary-added bird's-eye view image and the merged bird's-eye view image may be generated directly from photographed images, with using a composite transformation table. As long as the described functions can be realized, the functional blocks can be take various forms.

INDUSTRIAL APPLICABILITY

The present invention may be used for any system effecting monitoring of vehicle periphery with using a bird's-eye view image.

REFERENCE SIGNS LIST

21: monitor (displaying section)
50: image processing module
53: image generation section
55: displaying image determination section
6: displaying bird's-eye view image generation section
61: bird's-eye view image generation section
62: bird's-eye view image mapping table
63: boundary-added bird's-eye view image generation section
64: merged bird's-eye view image generation section
66: boundary indicator addition section
67: boundary indicator storage section
68: merger section
69: merger table
71: display control section

The invention claimed is:
1. A vehicle periphery monitoring system comprising:
a bird's-eye view image generation section generating bird's-eye view image segments from multiple photographed images photographed to be partially overlapped in a vehicle circumference direction;
a boundary indicator addition section adding a boundary indicator indicating a boundary area of the bird's-eye view image segments adjacent each other to an overlapped area of the bird's-eye view image segments;
a merger section generating a merged overlapped image by merging mutually overlapped areas of the bird's-eye view image segments according to a preset merger relationship;
a display bird's-eye view image generation section generating a merged bird's-eye view image containing a boundary-added bird's-eye view image having the boundary indicator and the merged overlapped image as a bird's-eye view image for display;
a displaying section displaying the bird's-eye view image for display; and
a display image determination section displaying the merged bird's-eye view image in the displaying section after displaying the boundary-added bird's-eye view image therein,
wherein in a display switchover process from g, of the boundary-added bird's-eye view to displaying of the merged bird's-eye view image as the displaying bird's-eye view image, displaying is switched over to display- ing of the merged overlapped image progressively and concentrically from vicinity of the vehicle.

2. The vehicle periphery monitoring system according to claim 1, wherein the boundary-added bird's-eye view image is generated as the overlapped area in the boundary-added bird's-eye view image appropriates the overlapped area of one bird's-eye view image segment; and the merged bird's-eye view image is generated as this overlapped area is replaced by the merged overlapped image generated by the merger section.

3. The vehicle periphery monitoring system according to claim 1, wherein the display image determination section is configured to display the merged bird's-eye view image after lapse of a period set after displaying of the boundary-added bird's-eye view image in the displaying section.

4. The vehicle periphery monitoring system according to claim 1, wherein in a display switchover process from displaying of the boundary-added bird's-eye view image to displaying of the merged bird's-eye view image as the bird's-eye view image for display, displaying is switched over sequentially from displaying of an area of the boundary indicator to displaying of the merged overlapped image.

5. The vehicle periphery monitoring system according to claim 1, wherein the boundary indicator is displayed with emphasis in a display switchover process from displaying of the boundary-added bird's-eye view image to displaying of the merged bird's-eye view image as the bird's-eye view image for display.

6. The vehicle periphery monitoring system according to claim 1, wherein in the boundary-added bird's-eye view image, no merger process is effected for the overlapped area where the multiple bird's-eye view image segments are overlapped with each other.

7. The vehicle periphery monitoring system according to claim 1, wherein the boundary-added bird's-eye view image is displayed after startup of the vehicle periphery monitoring system.

8. The vehicle periphery monitoring system according to claim 1, wherein the merged bird's-eye view image is added with a boundary indicator.

9. The vehicle periphery monitoring system according to claim 8, wherein the boundary indicator added to the merged bird's-eye view image is semitransparent.

10. The vehicle periphery monitoring system according to claim 8, wherein the boundary indicator added to the merged bird's-eye view image is shorter than the boundary indicator added to the bird's-eye view image for display.

11. The vehicle periphery monitoring system according to claim 8, wherein the boundary indicator added to the merged bird's-eye view image is a dotted line.

12. The vehicle periphery monitoring system according to claim 8, wherein the boundary indicator added to the merged bird's-eye view image is thinner than the boundary indicator added to the bird's-eye view image for display.

13. The vehicle periphery monitoring system according to claim 1, wherein the merged bird's-eye view image is added with a boundary indicator in a displaying form different from a displaying form of the boundary indicator of the bird's-eye view image for display.

* * * * *